(12) United States Patent
Makkus et al.

(10) Patent No.: US 6,761,927 B1
(45) Date of Patent: Jul. 13, 2004

(54) METHOD FOR COATING A SUPPORT PLATE AND FUEL CELL PROVIDED WITH SUCH A SUPPORT PLATE

(75) Inventors: Robert Christiaan Makkus, Alkmaar (NL); Edward Bullock, Bergen (NL); Arnoldus Hermannus Henderikus Janssen, Alkmaar (NL); Michel Cassir, Paris (FR)

(73) Assignees: Stichting Energieonderzoek Centrum Nederland, Petten (NL); Gemeenschappelijk Centrum voor Onderzoek Petten, Petten (NL)

( * ) Notice: Subject to any disclaimer, the term of this patent is extended or adjusted under 35 U.S.C. 154(b) by 0 days.

(21) Appl. No.: 09/807,025

(22) PCT Filed: Oct. 8, 1999

(86) PCT No.: PCT/NL99/00624
§ 371 (c)(1),
(2), (4) Date: Jun. 7, 2001

(87) PCT Pub. No.: WO00/21152
PCT Pub. Date: Apr. 13, 2000

(30) Foreign Application Priority Data

Oct. 8, 1998 (NL) ............................................. 1010269

(51) Int. Cl.⁷ ............................. B05D 1/36; B05D 5/12; B05D 1/08
(52) U.S. Cl. ....................... 427/115; 427/446; 427/402; 427/404; 427/419.1; 427/419.2
(58) Field of Search ................................ 427/115, 446, 427/402, 419.1, 419.2, 404

(56) References Cited

U.S. PATENT DOCUMENTS

| | | | | |
|---|---|---|---|---|
| 4,226,897 A | * | 10/1980 | Coleman | 438/96 |
| 5,287,730 A | * | 2/1994 | Condon | 73/49.8 |
| 5,805,973 A | * | 9/1998 | Coffinberry et al. | 428/551 |
| 6,153,324 A | * | 11/2000 | Hiermaier et al. | 429/16 |
| 6,335,105 B1 | * | 1/2002 | McKee | 428/623 |

FOREIGN PATENT DOCUMENTS

| | | | |
|---|---|---|---|
| DE | 26 19 417 | | 11/1977 |
| DE | 195 23637 | | 7/1996 |
| DE | 19523637 A | * | 7/1996 |
| JP | 01 092350 | | 4/1989 |
| JP | 5-339748 | | 12/1993 |
| WO | WO 96/35825 | | 11/1996 |

* cited by examiner

*Primary Examiner*—Michael Barr
(74) *Attorney, Agent, or Firm*—Young & Thompson

(57) ABSTRACT

Method for coating a non-oxidised stainless steel support plate and a MCFC fuel cell stack provided with a separator plate coated in this way. First a diffusion barrier layer and then a nickel layer are applied to the anode side of the support plate. The diffusion barrier layer consists of titanium oxide and the adhesion between titanium oxide and the support plate can be improved by providing an adhesion layer.

16 Claims, 1 Drawing Sheet

METHOD FOR COATING A SUPPORT PLATE AND FUEL CELL PROVIDED WITH SUCH A SUPPORT PLATE

BACKGROUND OF THE INVENTION

The present invention relates to a method for coating a non-oxidised stainless steel support plate with an electrically conducting corrosion-resistant coating, comprising applying a diffusion barrier layer containing a titanium compound, followed by applying a nickel layer. A method of this type is disclosed in German Offenlegungsschrift 19523637. High demands are imposed on that part of the fuel cell which is located on the anode side. On the one hand this must be capable of discharging the stream supplied via the gas distribution device on the anode side. On the other hand this must be sufficiently corrosion-resistant to meet current requirements in respect of service life. Currently a service life of a few ten thousand hours is required. Because of the aggressive environment resulting from carbonate material, high temperature and the relatively low potential at the anode, this side of the separator plate is particularly severely stressed.

In order to avoid the corrosion problems it is proposed in the abovementioned German Offenlegungsschrift to apply a coating, consisting of a titanium nitride layer on top of which a nickel layer has been applied, on the anode side of the stainless steel separator plate. This nickel layer provides protection but the base material from the stainless steel must be prevented from diffusing into the nickel. After all, it has been observed that the strength of the residual nickel layer decreases appreciably as a result of such a diffusion process and within 10 000 hours the residual nickel layer detaches from the stainless steel layer and the cell rapidly becomes inoperative. According to German Offenlegungsschrift 19523637, the thickness of the titanium nitride layer is preferably between 0.5 and 5 $\mu$m. It is assumed that the titanium nitride is converted to titanium oxide by contact with the carbonate material. However, it has been found that this oxide has a larger volume and consequently locally pushes away the nickel layer. Moreover, it has been found that a titanium oxide layer obtained in this way is not impermeable and attack on the base material can consequently not be prevented.

In German Offenlegungsschrift 4030943 an anode made up of porous nickel and titanium oxide is described. On contact with lithium carbonate lithium titanate is produced, which promotes moistening of the porous nickel anode because carbonate material penetrates into the anode more easily. The separator plate or bipolar plate is nickel-coated and consists of stainless steel material.

SUMMARY OF THE INVENTION

The aim of the present invention is to provide a method for coating a separator plate of a fuel cell wherein a diffusion barrier layer is used which remains intact even after prolonged operation and wherein the corrosion-resistant nickel layer arranged thereon is not affected.

This aim is achieved with a method as described above in that said titanium compound comprises titanium oxide.

As a result of applying titanium oxide directly to the stainless steel base material, no harmful reaction takes place when carbonate diffuses through the porous nickel top layer. It is assumed that $TiO_2$ in contact with the carbonate converts the top layer into $Li_2TiO_3$. This does not have any adverse effect on the electrical properties of the coating. The bulk of the $TiO_2$ is converted into a sodium-titanium bronze or a potassium-titanium bronze. This material still has barrier properties relative to the alloy elements from the stainless steel. A further guarantee that the barrier layer remains intact even during a prolonged period is achieved by giving the layer an appreciable thickness. Preferably the thickness is at least 25 $\mu$m and more particularly is between 40 and 50 $\mu$m.

The titanium oxide layer described above can be applied in any way known from the prior art. Examples are application of a plasma spray under atmospheric pressure or high velocity oxygen flame spraying, sputtering, vaporisation using an arc, adhesion and sputtering using an arc, ion plating or CVD.

According to a further advantageous embodiment of the invention the titanium oxide is applied to the stainless steel support only after an adhesion layer, such as a layer of NiCrAlY, has been placed thereon.

As described above, the invention is used in particular for a fuel cell in which the separator plate or bipolar plate on the anode side has been treated as described above. It must be understood that the method described above can be used in other applications under aggressive conditions where electrical conduction is required.

BRIEF DESCRIPTION OF THE DRAWINGS

The invention will be explained below with reference to an illustrative embodiment shown in the drawing, in which the various components are not shown on the same scale. In the drawing.

DETAILED DESCRIPTION OF THE PREFERRED EMBODIMENT

Figure 1:
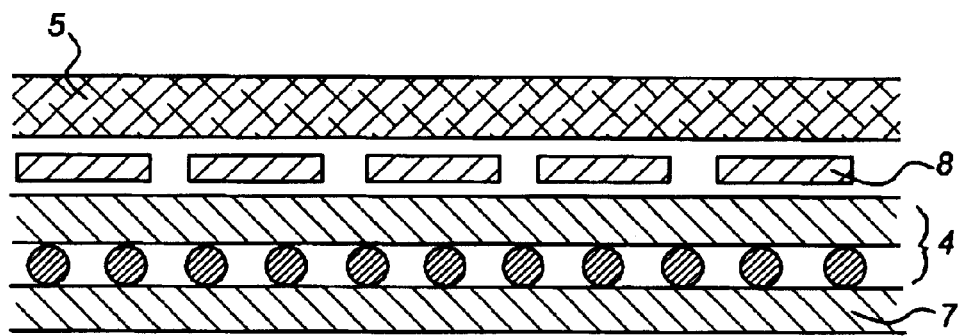
FIG. 1 shows, diagrammatically in cross-section, part of an MCFC cell close to the separator plate according to the invention.

FIG. 1 shows part of an MCFC cell provided with a separator plate 7 which is adjoined by a gas distribution device 4 on the anode side, with which current collector 8 is in contact, which is adjoined by an anode 5. Both the anode and the corrugation can be made of nickel material. The anode consists more particularly of nickel containing 10% (by wt.) Cr.

Figure 2:
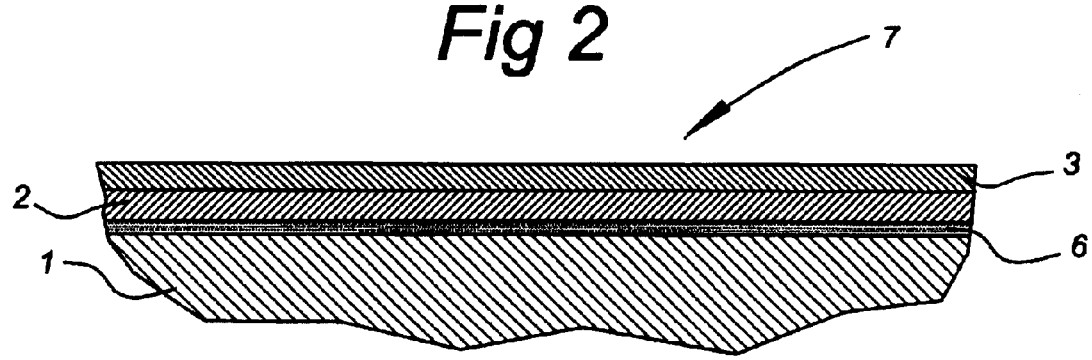
FIG. 2 shows, in detail in cross-section, part of a separator plate facing the anode.

The separator plate 7 is shown in detail in FIG. 2. This separator plate consists of a support of stainless steel material, such as 1 AISI 310 having a thickness of, for example, 0.5 mm. An adhesion layer 6 composed of a metal chromium aluminium yttrium alloy, such as NiCrAlY, is applied on top of this. The thickness of this layer is approximately 40–60 m. The adhesion layer material can be applied in powder form by using as the starting material an NiCrAlY powder having a particle size of between 10 and 45 $\mu$m, which is applied using the HVOF spraying technique.

An adhesion layer of this type is applied in order to compensate for the difference in the coefficient of expansion between stainless steel and the titanium oxide layer. Before applying such an adhesion layer to the stainless steel support material, the stainless steel material can be roughened by any method known from the prior art. For example roughening takes place by means of grit blasting with fine $Al_2O_3$ grit.

A titanium oxide layer having a thickness of between 40 and 50 $\mu$m is then applied thereon using the high velocity oxygen flame spraying technique. This layer is indicated by 2. The starting material used for this layer is a powder having a particle size of between 5 and 20 µm. This powder can optionally be doped with a pentavalent ion, in particular with niobium or tantalum. Niobium is the most preferred. The porosity of the titanium oxide layer is typically 2%. A nickel layer 3, having a thickness which is likewise between 25 and 50 µm, is applied on top of said titanium oxide layer by any method known from the prior art. In this case also the HVOF spraying technique is preferably used.

In tests under corrosive conditions with the potential applied to the anode, as is to be expected in use, no substantial attack on the stainless steel base material was detected at a temperature of approximately 650° C. after 3 000 hours. On the basis of this it can be extrapolated that a service life of more than 40 000 hours is achievable.

Although the invention has been described above with reference to a preferred embodiment, it must be understood that modifications can be made thereto which are immediately obvious to those skilled in the art after reading the above description and are within the scope of the appended claims.

What is claimed is:

1. Method for coating a non-oxidized stainless steel support plate with an electrically conducting corrosion-resistant coating, comprising applying a diffusion barrier layer containing a titanium compound, followed by applying a nickel layer and introducing said support plate into a carbonate material environment, wherein applying said diffusion barrier layer comprises the application of a titanium oxide containing compound before applying said nickel layer.

2. Method according to claim 1, wherein at least one of said applied layers has a thickness of at least 25 µm.

3. Method according to claim 1, wherein an adhesion layer is applied to the support plate before titanium oxide is applied.

4. Method according to claim 3, wherein said adhesion layer comprises NiCrAlY.

5. Method according to claim 1, wherein at least one of said layers is applied by high velocity oxygen flame spraying.

6. A method for manufacturing a non-oxidized stainless steel support plate with an electrically conducting corrosion-resistant coating for a fuel cell, comprising the steps of:

applying a diffusion barrier layer containing a titanium oxide compound to a non-oxidized stainless steel substrate;

then, applying a nickel layer over said diffusion barrier; and subsequently, placing said support plate in direct contact with a carbonate material environment.

7. The method as claimed in claim 6, further comprising the step of applying an adhesion layer to the non-oxidized stainless steel substrate, before the step of applying the diffusion barrier.

8. The method as claimed in claim 7, wherein said diffusion barrier layer is directly over said adhesion layer.

9. The method as claimed in claim 8, wherein the nickel layer is directly over said diffusion barrier layer.

10. The method as claimed in claim 7, wherein a thickness of at least one of said diffusion barrier layer and said adhesion layer is between 40 and 50 µm.

11. The method as claimed in claim 7, wherein said step of applying the adhesion layer comprises applying an NiCrAlY powder having a particle size of between 10 and 45 µm.

12. The method as claimed in claim 6, wherein the diffusion barrier layer is directly over said substrate.

13. The method as claimed in claim 12, wherein the diffusion barrier layer is applied using a high velocity oxygen flame spraying technique.

14. The method as claimed in claim 12, wherein the diffusion barrier layer has a starting material that is a powder having a particle size of between 5 and 20 µm.

15. The method as claimed in claim 14, wherein the powder is doped with a pentavalent ion.

16. The method as claimed in claim 15, wherein the pentavalent ion is one of niobium and tantalum.

* * * * *